May 9, 1967 O. ARNOLD 3,319,084

LIMIT DETECTOR WITH INDUCTORS CONNECTED IN SERIES AIDING AND MUTUAL COUPLING TO REDUCE PARASITIC INDUCTANCE

Filed Aug. 24, 1964

INVENTOR
O. ARNOLD
BY George C. Ford
ATTORNEY 3,319,084
Patented May 9, 1967

3,319,084

LIMIT DETECTOR WITH INDUCTORS CONNECTED IN SERIES AIDING AND MUTUAL COUPLING TO REDUCE PARASITIC INDUCTANCE

Otto Arnold, Keyport, N.J., assignor to Bell Telephone Laboratories, Incorporated, New York, N.Y., a corporation of New York Filed Aug. 24, 1964, Ser. No. 391,684
1 Claim. (Cl. 307—88.5)

This invention relates to a signal amplitude detector and more particularly to circuitry that detects excusions of the amplitude of a signal beyond prescribed limits.

One type of limit detector produces output pulses of one polarity when the signal to be detected rises above an upper limit and produces output pulses of the opposite polarity when the signal to be detected drops below a lower limit. So long as the signal to be detected remains within the limits no output is produced. Among other applications, this type of limit detector is useful as a summing network or comparator in a feedback control system that sets the level of flux in a transfluxor. An example of a limit detector operating in this environment is given in Patent 3,128,434 issued Apr. 7, 1964 to H. Moreines. Certain characteristics are sought in this type of limit detector: stable output properties, i.e., pulses constant in height, width, voltage-time integral, and repetition rate; stable upper and lower limits; and fast response time to changing input conditions.

It is the object of this invention to improve the characteristics of the above-mentioned type of limit detector, including stability of the properties of the output pulses and the response time.

To achieve this object two circuit branches are provided, each comprising a tunnel diode and an inductor connected in series capable of operating as a relaxation-type oscillator under certain bias conditions. The two branches are connected in series across a source of bias potential having a value insufficient by itself to cause the tunnel diodes to oscillate. The input current component caused by the signal to be detected, applied at the junction of the two branches, adds to the component of current caused by the bias source that flows through one branch and subtracts from the component of current caused by the bias source that flows through the other branch. When the signal to be detected rises above an upper limit the net current flowing through one branch is sufficiently large to bias one tunnel diode so as to oscillate and generate pulses of one polarity, and when the signal to be detected drops below a lower limit the net current flowing through the other branch becomes sufficiently large to bias the other tunnel diode so as to oscillate and generate pulses of the opposite polarity. The properties of the pulses are dependent predominantly upon the voltage-current, i.e., V-I, characteristics of the tunnel diodes and the inductance of the inductors, which are very stable.

The inductors of the two branches are magnetically coupled to one another such that, as to the input current applied to the junction of the two branches, the mutual inductance of each branch tends to cancel the self-inductance of the branch. Consequently, the inductors of the two branches exert little or no inductive effect upon the input impedance of the limit detector, making fast response to changing input conditions possible.

These and other features of the invention will become more apparent from the following detailed description taken in conjunction with the drawing in which.

Figure 1:
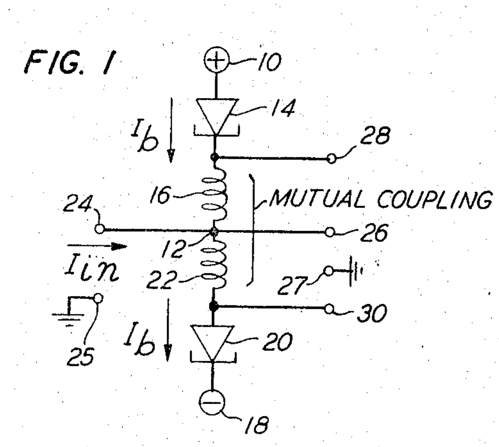
FIG. 1 is a schematic circuit diagram of apparatus arranged according to the invention.

FIG. 1 discloses a limit detector having a branch connected between a center node 12 and a source 10 of positive potential with respect to ground. The branch comprises the series combination of a tunnel diode 14 and an inductor 16. A second branch connected between center node 12 and a source 18 of negative potential with respect to ground comprises the series combination of a tunnel diode 20 and an inductor 22. Inductors 16 and 22 are adapted so that as much mutual magnetic coupling as possible exists between them. In practice, this could be achieved by employing a single inductor having a center tap, represented in FIG. 1 by common node 12 and possibly a core to increase coupling. More about the mutual magnetic coupling and its effect are disclosed below. An input terminal 24 is connected to common node 12 and another input terminal 25 is connected to ground. Alternative output connections are provided depending upon whether an unbalanced or a balanced output is desired. In the former case output terminals 26 and 27 are used and in the latter output terminals 28 and 30 are used.

Figure 3A:
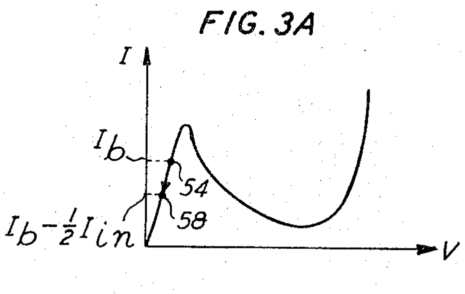
FIGS. 3A and 3B are graphs illustrating the V-I characteristic curves of the tunnel diodes shown in FIG. 1.
Figure 3B:
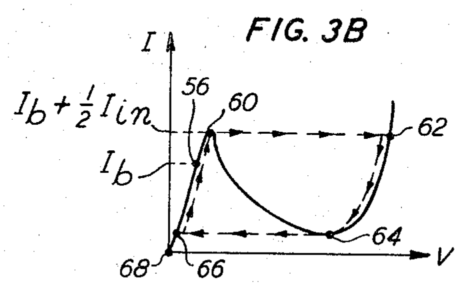

The component of current passing through the two branches which is caused by sources 10 and 18 is represented in FIG. 1 by the arrows labeled "$I_b$" and the current caused by the signal applied to input terminal 24 is represented by the arrow labeled "$I_{in}$." The potential of sources 10 and 18 is of such value that with no input current $I_{in}$ tunnel diodes 14 and 20 are each biased to operate at a point in one of its stable, positive resistance regions, as for example point 54 in FIG. 3A and point 56 in FIG. 3B, where FIG. 3A represents the V-I characteristic curve of one tunnel diode and FIG. 3B the V-I characteristic curve of the other tunnel diode. FIG. 1 shows that input current $I_{in}$ divides at common node 12 and in the upper branch subtracts from the component of bias current $I_b$, while in the lower branch it adds to the component of bias current $I_b$. As a result, increases in the input current $I_{in}$ increase the net current in the lower branch and decrease the net current in the upper branch. On the other hand, decreases in the input current $I_{in}$ decrease the net current in the lower branch and increase the net current in the upper branch.

Figure 2A:
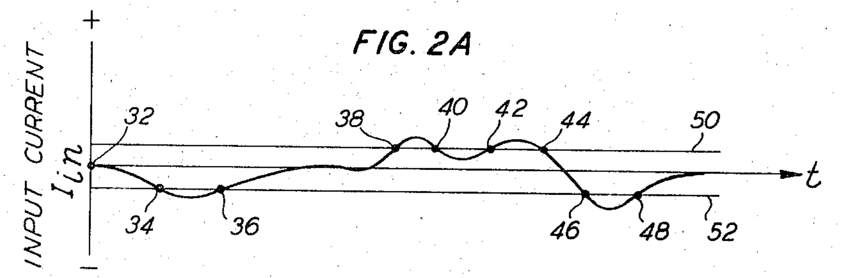
FIGS. 2A and 2B are graphs illustrating the nature of the input signal and output signal, respectively, of the apparatus shown in FIG. 1.
Figure 2B:
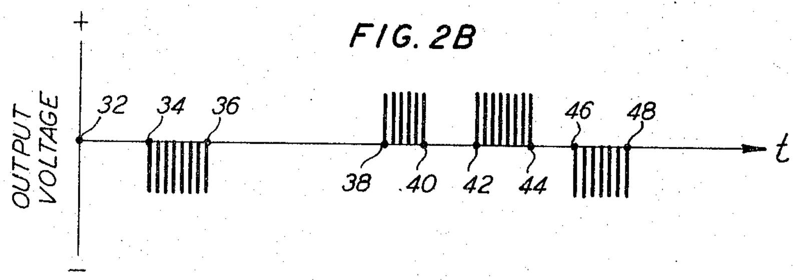

FIG. 2A illustrates positive and negative variations in the input current about zero as a function of time. A line 50 represents the positive, upper current limit above which the limit detector generates pulses of one polarity and a line 52 represents the negative, lower current limit below which the limit detector generates pulses of the other polarity. Assume that the input signal is at a zero current point 32 in FIG. 2A and is decreasing in amplitude. In such case point 54 in FIG. 3A represents the point of operation of tunnel diode 20 on its V-I characteristic curve and point 56 represents the operating point of tunnel diode 14 on its V-I characteristic curve. As the input current $I_{in}$ varies from zero at point 32 toward a point 34 in FIG. 2A the net current through tunnel diode 20 decreases and the operating point of diode 20 moves toward a point 58. At the same time, the net current through tunnel diode 14 increases and its operating point moves closer to a peak point 60 on its V-I characteristic curve where it begins to oscillate as a relaxation-type oscillator. At point 34 in FIG. 2A the input current $I_{in}$ falls below the lower limit at line 52 and the net current hrough tunnel diode 14 reaches the value represented by point 60 in FIG. 3B. From point 60 the operating point of tunnel diode 14 jumps to a point 62, representing the leading edge of a pulse. The current through tunnel diode 14 then decays until a point 64 is reached in FIG. 3B. The time required for the current to decay from point 62 to point 64 is the pulse duration or width. From point 64 the operating point of tunnel diode 14 jumps to a point 66, representing the trailing edge of a pulse. The current then rises to point 60 where the cycle is repeated. The time required for the current to rise from point 66 to point 60 is the duration between pulses. As long as the input current $I_{in}$ remains below the lower limit, represented in the graph of FIG. 2A as the intervals between points 34 and 36 and between points 46 and 48, negative pulses are generated in the upper branch in FIG. 1. These pulses are represented by the vertical lines between points 34 and 36 and between points 46 and 48 in FIG. 2B. When the input current $I_{in}$ rises above the lower limit, the net current through tunnel diode 14 is reduced to the point that tunnel diode 14 again operates about point 56 on its V-I characteristic curve without oscillations.

When the input current $I_{in}$ rises above the upper limit as illustrated in the intervals between points 38 and 40 and between points 42 and 44 in FIG. 2A the roles of tunnel diodes 14 and 20 are reversed. In this case the net current passing through tunnel diode 14 decreases as illustrated in FIG. 3A and the net current through tunnel diode 20 increases until tunnel diode 20 oscillates as a relaxation-type oscillator, producing a series of positive pulses represented in the intervals between points 38 and 40 and between points 42 and 44 in FIG. 2B. The properties of all the pulses produced by the described circuit are primarily dependent upon the V-I characteristics of tunnel diodes 14 and 20 and the inductance of inductors 16 and 22, which are very stable and which are insensitive to variations in the potential of sources 10 and 18. Moreover, the stability of the upper and lower limits is good because it depends largely upon the tunnel diode peak, represented in FIG. 3B by point 60.

If it is desired to detect a signal which when applied to the circuit of FIG. 1 does not cause a current varying between limits that are symmetrical about zero current, an additional bias must be provided such that the net current applied at common node 12 varies between limits that are symmetrical about zero current. For example, if the signal to be detected causes a current varying between limits that are symmetrical about a positive current of 25 milliamperes (i.e., point 32 in FIG. 2A is 25 milliamperes instead of zero), the additional bias applied to common node 12 must produce a negative current of 25 milliamperes.

The mutual magnetic coupling existing between inductors 16 and 22 is as great as possible and is such that as to the input current $I_{in}$ the mutual inductance cancels, entirely or in part, the self-inductance in that branch. Stated another way flow of input current through inductor 16 produces a certain flux field that cancels the flux field produced by the flow of input current through inductor 22. As a result, the input current $I_{in}$ causes few or no flux-linkages in inductors 16 and 22 and essentially no inductive reactance appears in the input impedance of the circuit of FIG. 1. Thus this circuit is capable of responding quickly to changes in input current $I_{in}$ regardless of the input impedance of the source of signals to be detected. If mutual magnetic coupling of the proper relationship between inductors 16 and 22 were not provided, the response time of the circuit would be inversely proportional to the internal resistance of the source of signals to be detected.

As to the current component flowing in the direction of bias current $I_b$, the mutual magnetic coupling does not cancel the self-inductance of inductors 16 and 22, but reinforces it. Thus the inductance required to make the tunnel diodes oscillate remains extant, although its effect at input terminal 24 is extinct.

The advantages of the invention also result when the points of application of bias and signal to be detected are reversed. Then a source of bias would have to be applied at terminal 24, the signal source would have to be applied between the anode of tunnel diode 14 and the cathode of tunnel diode 20, and the polarity of mutual coupling would have to be reversed.

Figure 4:
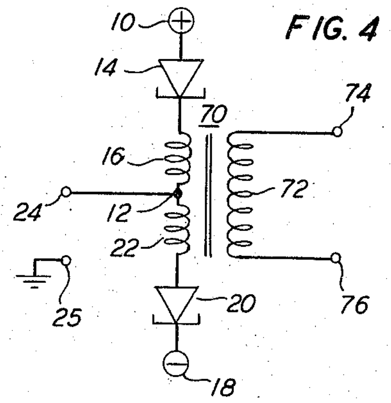
FIG. 4 is a schematic circuit diagram of a modification of the apparatus of FIG. 1.

FIG. 4 discloses a modification of the circuit of FIG. 1. In this arrangement inductors 16 and 22 also function as primary windings of a transformer 70 having a secondary winding 72. The transformer serves to rectify the pulses produced in the two branches of the primary circuit. Thus a unipolar pulse appears across output terminals 74 and 76, regardless of which tunnel diode is oscillating.

What is claimed is:

A limit detector comprising a source of unidirectional bias current, a pair of relaxation oscillators connected in series with said source, each of said relaxation oscillators being composed of a respective serially connected tunnel diode and inductor and operating whenever the current through it exceeds a predetermined level which is in excess of the bias current supplied from said source, and an input terminal connected to the junction between said relaxation oscillators so that current applied thereto aids the bias current in one of said relaxation oscillators and opposes the bias current in the other, said inductors being magnetically coupled in series aiding relation so that current applied to said input terminal causes substantially no flux linkage between said inductors.

References Cited by the Examiner

UNITED STATES PATENTS

| | | | |
|---|---|---|---|
| 2,202,308 | 12/1935 | Ganz | 179—78 |
| 3,267,292 | 8/1966 | Dunnet et al. | 307—88.5 |

OTHER REFERENCES

Electronics, June 1960 "Tunnel Diode Logic Circuits," pages 103–107 (copy in Scientific Library and 307–88.5NNR).

IBM Technical Disclosure Bulletin, "Esaki Diode Binary Trigger," by Myers, vol. 3, No. 9, February 1961, 307–88NNR, p. 32.

GE Tunnel Diode Manual, page 61, March 1961 (copy in Scientific Library, TK 7872 D6G45 and Group 250).

DAVID J. GALVIN, *Primary Examiner.*

B. P. DAVIS, *Assistant Examiner.*